United States Patent
Nishibori

[19]

[11] Patent Number: 5,871,161
[45] Date of Patent: Feb. 16, 1999

[54] METHOD AND APPARATUS FOR RECYCLING LAMINATED FILM

[75] Inventor: Sadao Nishibori, Tokyo, Japan

[73] Assignee: Ein Engineering Co., Ltd., Tokyo, Japan

[21] Appl. No.: 740,896

[22] Filed: Nov. 4, 1996

[30]   Foreign Application Priority Data

Apr. 9, 1996 [JP] Japan .................................. 8-086532

[51] Int. Cl.⁶ ........................... B02C 19/12; B02C 23/08
[52] U.S. Cl. .................... 241/19; 241/24.13; 241/24.18; 241/79.1; 241/152.2; 241/DIG. 38
[58] Field of Search ................. 241/18, 19, 20, 241/24.18, 24.19, 27, 79.1, 152.2, DIG. 38, 24.13

[56]   References Cited

U.S. PATENT DOCUMENTS

| | | | |
|---|---|---|---|
| 4,200,486 | 4/1980 | Vagac et al. | 162/8 |
| 4,483,486 | 11/1984 | Luff et al. | 241/23 |
| 5,257,740 | 11/1993 | Prew et al. | 241/21 |
| 5,277,758 | 1/1994 | Brooks et al. | 162/4 |
| 5,297,741 | 3/1994 | Zuern et al. | 241/14 |
| 5,323,971 | 6/1994 | Nishibori et al. | |
| 5,351,895 | 10/1994 | Brooks et al. | 241/41 |
| 5,358,184 | 10/1994 | Skudrzyk | 241/16 |
| 5,390,860 | 2/1995 | Azi et al. | 241/20 |
| 5,647,544 | 7/1997 | Greiner et al. | 241/17 |
| 5,738,286 | 4/1998 | Nishibori | 241/24.14 |
| 5,785,259 | 7/1998 | Nishibori | 241/24.18 |

FOREIGN PATENT DOCUMENTS

| | | |
|---|---|---|
| 2 366 065 | 7/1977 | France . |
| 27 04 035 | 8/1978 | Germany . |
| 33 43 788 | 6/1985 | Germany . |
| 8-169015 | 7/1996 | Japan . |

*Primary Examiner*—John M. Husar
*Attorney, Agent, or Firm*—Foley & Lardner

[57]   ABSTRACT

A method and apparatus for individually collecting layers from a laminated film containing many layers made of different materials by peeling or separating the layers one from the other. The laminated film having a plurality of layers made of different materials is shredded into a plurality of fragments to be processed; and the fragments to be processed are peeled or separated according to the type of layer by applying an impact frictional striking force to each of the fragments to be processed. Subsequently, the peeled or separated layers obtained in the peeling and separating step are subjected to a wind force classifying step. The collected layers in the mixed state are separated from one another, and they are individually collected.

16 Claims, 6 Drawing Sheets

Classifying Step 305

Peeling & Separating Step 303

Shredding Step 301

Plastic Films

Paperboard

METHOD AND APPARATUS FOR RECYCLING LAMINATED FILM

BACKGROUND OF THE INVENTION

1. Field of the Invention

The present invention relates to a method and apparatus for recycling laminated films. For instance, the laminated films may comprise a milk carton (a milk container made of paper), a retort pouch used for packaging a brick-type paper container or packaging curry sauce or stew, a laminated film which includes an aluminum foil layer and is used as wrapping paper for chocolate bars, and various types of laminated films which are composed of a plurality of different materials such as paper, aluminum foil, and plastic film. The present invention relates to a method and apparatus for individually collecting layers forming a laminated film by peeling and separating them from one another. More preferably, the present invention relates to a method and apparatus for reproducing high-quality virgin materials from pulp of the laminated film including a layer of paper (hereinafter referred to as a paper layer).

2. Description of the Prior Art

A laminated film combines the lightweight and ease-in-processing features of paper, the waterproof and heat-sealing characteristics of plastic film, and the gas barrier properties of aluminum foil. Further, the laminated film is relatively easily disposed of after it has been used. Because of these features, it is very popular to package articles in a laminated film which is made using laminating or coating techniques. One type of package particularly widely used is a paper container with a laminated film (hereinafter simply referred to as a paper container) which is made of a paperboard sandwiched between layers of plastic film, as shown in FIG. 7. The paper container of this type is used for containing milk, etc. Another paper container with a laminated film is made of a paperboard having both ends covered with aluminum foil and plastic films further laminated on the aluminum foil. This type of paper container is used for containing long-life milk, fruit juice, and so forth. Even when counting only milk packages, nine million packages or more are produced every day throughout Japan.

The above-mentioned packaging containers have normally been discarded together with flammable wastes before incineration. As described above, laminated films include layers made of various materials, and hence simple incineration of the laminated films may generate noxious fumes or environmental pollution. If the waste laminated films could be recycled, it would be possible to contribute to the preservation of the environment as well as to the conservation of natural resources which tend to become depleted.

However, it is difficult to recycle the above-described laminated films comprising a plurality of different material layers. Although the laminated films including paper layers have so far been recycled, the laminated films comprising many different material layers are never recycled yet. In the meantime, laminated films comprising paper layers are recycled in the same manner as waste paper is recycled in a manner described below, and therefore, various problems are encountered in the recycling of such laminated films.

As an initial step, the laminated films which include paper layers are introduced together with water and chemicals into a bath having mixing vanes. Paper included in the laminated films is disaggregated in water and fibrously disentangled. Foreign substances are eliminated from a suspension in which the fibrous paper is mixedly included. To more completely disaggregate the paper, the suspension is introduced into a high-speed disaggregating machine. The thus disaggregated suspension passes through a mesh filter, so that plastic film and aluminum foil are removed from the suspension. Subsequently, sodium hydroxide, which acts as a deinking agent; alkaline chemicals; and a detergent are mixed into the suspension in which the laminated film is disaggregated. Shredded plastic sheets, aluminum foil, and small foreign particles such as hair are again eliminated, and the suspension is then dehydrated. The resultant pulp is fed to a bleaching process, whereby bleached pulp is recovered.

In the above described conventional method of recycling the laminated films comprising paper layers, the films are mixed in a liquid substance in order to fibrously disentangle the paper in the laminated films. Printed layers come away from the surface of the laminated films and are dispersed in the suspension. As a result, the thus-recovered paper fibers are colored by the dispersed ink.

It is difficult to completely recover the fibrous paper layers from the suspension while leaving other substances behind. Unrecovered fibrous paper, shredded plastic films, and aluminum foil remain mixed in a waste liquid from which the paper fibers have been recovered. It is necessary to recover these mixed substances by precipitating them in a settling bath before disposing of the waste liquid.

Further, it is necessary to neutralize the chemicals introduced in the waste liquid when disposing of the waste liquid in which various chemicals are mixed. Various costs incurred by the steps and equipment required to carry out the neutralizing operation are considerably large.

According to the above described conventional recycling method, it is possible to recover paper layers from the laminated films comprising the paper layers, but it is impossible to individually recover the plastic film layer and the aluminum foil layer in a recyclable manner.

SUMMARY OF THE INVENTION

The present invention has been conceived in view of the foregoing drawbacks in the conventional art, and the object of the present invention is to provide a method and apparatus which recycles laminated films, particularly laminated films including paper layers, in a manner completely different from that of a conventional method. That is, the object of the present invention is to recycle laminated films by affording an impact frictional striking force to the laminated films. More specifically, an object of the present invention is to make it possible to recycle laminated films which do not include any paper layers;

Secondary, another object of the invention is to make it possible to prevent recycled paper fibers from being colored by ink which has come away from the surface of the laminated films;

Thirdly, further object of the present invention is to make it possible to eliminate the necessity of disposing of a waste liquid when the paper fibers are recovered and, therefore, to omit equipments required to dispose of the waste liquid;

the fourth object of the present invention is to make it possible to substantially completely separate from one another and individually recover a paper layer, a plastic film layer, and an aluminum foil layer which form the laminated film; and the fifth abject of the present invention is to make it possible to easily and inexpensively recycle the laminated films without requiring the disposal of the waste liquid, a step of neutralizing chemicals, or an associated processing equipment to carry out these operations."

In order to accomplish the above objects, according to one aspect of the present invention, there is provided a method of recycling laminated films which include a plurality of layers made of different materials, the method comprising at least the following steps of:

shredding the laminated films into a plurality of fragments to be processed 82; and peeling and separating layers of the fragments to be processed 82 according to the type of layer, by applying an impact frictional striking force to each of the fragments to be processed 82 formed in the shredding step.

And classifying the separated and peeled layers of the fragments to be processed 82 passing a screen from the other in the preceding peeling and separating step. And the larger struck fragments to be processed 82 that do not pass the screen are returned to the step of applying an impact frictional striking force.

If each of the layers peeled and separated in the peeling and separating step is struck into substantially the same size by means of the impact frictional striking force, it will be more preferable to provide the method with of classifying, using a wind force, the peeled and separated fragments to be processed 82 and collecting the layers according to the type of layer.

It will be preferable for the laminated films to be processed in the preceding step to include at least a paper layer.

Specifically, the laminated film recycling method comprises the step 303 of peeling and separating a laminated film having layers of a paper and of a plastic film into a fibrously struck and separated paper layer and a plastic film layer 83*a* formed into a thin strip, and collecting the fibrously separated paper layer as aggregated and flocculated paper fibers, which have substantially the same length as material pulp and are free from stranded fibers even as a result of the separating operation, by classifying the separated paper layer from the plastic film layer 83*a*.

If the laminated films to be processed include an aluminum foil layer in addition to the paper layer and the plastic film layer, the laminated film recycling method further comprises the step of classifying the mixture of plastic film layer 83*a* and the aluminum foil layer 83*b* from the preceding step by means of a wind force for individually recovering the plastic film layer 83*a* and the aluminum foil layer 83*b*.

According to still another aspect of the present invention, there is provided an apparatus for recycling laminated films having a plurality of layers made of different materials, the apparatus comprising:

shredder which shreds the multilayered films into a plurality of fragments to be processed 82;

fixed-side peeling and separating means which includes a fixed disk whose center communicates with an inlet port for introducing the fragments to be processed 82 and pins fixedly provided on the fixed disk 131 so as to trace out a plurality of rotary trajectories; and movable-side peeling and separating means which includes a movable disk rotatably provided so as to be opposite to the fixed disk and movable pins provided on the movable disk so as to trace out a plurality of rotary trajectories different from those that the fixed pins trace out.

The laminated film recycling apparatus preferably further comprises:

collecting means which is disposed along the outer periphery defined by combination of the fixed pins and the movable pins and which communicates with an outlet port via a screen having small apertures formed therein, each aperture of a predetermined diameter;

means for taking out the separated fragments remaining in the screen via the outlet port; and the outlet port and the inlet port are held in communication with each other so that the struck fragment collected at the outlet port to be treated may be fed back to the inlet port by a communicating pipe, and a branching pipe is arranged to make the communicating pipe branched at the inlet port side and held in communication with a tank for collecting the struck fragment, a solenoid valve being disposed at the junction of the branching pipe; and peeling and separating means for peeling and separating the layers of the laminated films according to the type of layer by impacting upon and striking the fragments to be processed 82 between the fixed pins 134 and the movable pins using the impact frictional striking force.

If the fragments to be processed 82 include a plurality of peeled and separated layers, the laminated film recycling apparatus preferably further comprises wind force classifier which classifies the peeled and separated layers by a wind force, and which individually collects the layers peeled and separated from the fragments to be processed 82 as a result of the classifying operation.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENT

Laminated Films to be Processed by Recycling Method and Apparatus According to the Present Invention A method and apparatus for recycling a laminated film according to the present invention recycles, for example, the following laminated films as raw materials:

a laminated film which is composed of a paperboard having both sides coated with a polyethylene (PE) film and is used as a tetrapak (Registered Trademark), or the like;

a paper container (a gable-top-type paper container) for packaging purposes which is made of a laminated film, the laminated film comprising either paper having one side coated with a polyethylene (PE) film and the other side coated with an IR film or paper having one side coated with an IR film, aluminum foil, and an IR film, in that order, and the other side coated with a PE film, an EVOH film, or the like;

a laminated film which is made by recycling brick-type paper containers, or the like, and which has various types of paper layers; the brick-type paper containers comprising paper having one side coated with an IR film, aluminum foil, an IR film, and a PE film and the other side coated with a PR film;

a laminated film comprising a layer made of aluminum foil and a plastic film and another layer made of paper and aluminum foil; and a laminated film comprising a plurality of types of layers which are made of various materials.

Taking the facts that an object to be recycled should be stably available and that applications of recycled products should be established into consideration, a laminated film comprising a paper layer used in, for example, a milk container made of paper, is preferable as an object to be recycled.

The method and apparatus for recycling a laminated film comprising a paper layer, and a method and apparatus for recycling another laminated film will be described hereinbelow.

Means for recovering layers of the laminated film by peeling and separating them one from the other will now be described. The means comprises at least a shredding step 301 for shredding laminated films which were recovered from wasted laminated films, the paper containers, or the like, into fragments to be processed 82; and a peeling and separating step 303 in which the fragments to be processed 82 are struck by an impact frictional striking force and the thus-struck fragments are peeled and separated into layers.

If the layers of the laminated films are struck and separated into different sizes as a result of the application of an impact frictional striking force in the peeling and separating step 303, the separated layers can be classified by size in this step. The separated layers which remain unclassified can be classified and recovered for each layer by a wind force in a wind force classifying step 305 by taking advantage of the difference in specific gravity of the materials of the layers (see FIG. 1).

Shredding Step 301

Figure 1:
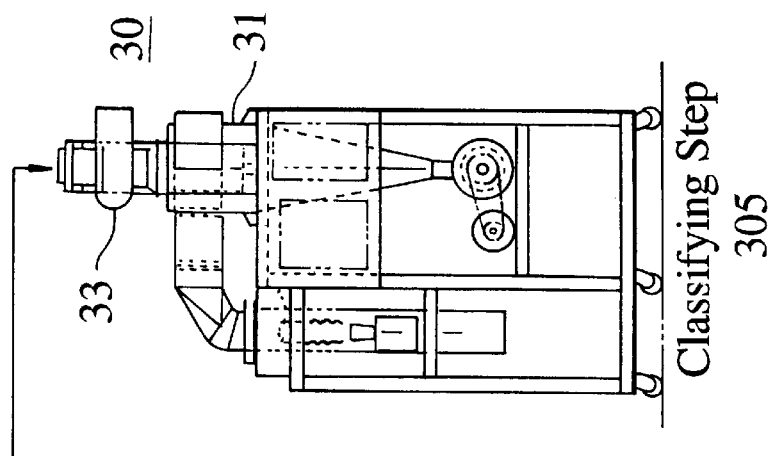
FIG. 1 is a system diagram which schematically shows the outline and principle of a shredding step, a peeling and separating step, and a wind force classifying step in the process of recycling laminated films according to one embodiment of the present invention.
Figure 1:
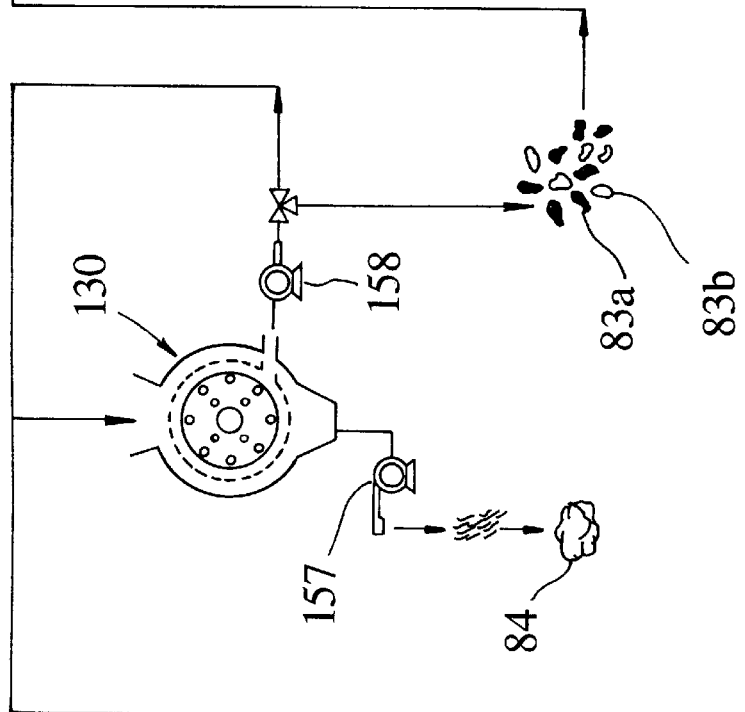
Figure 1:
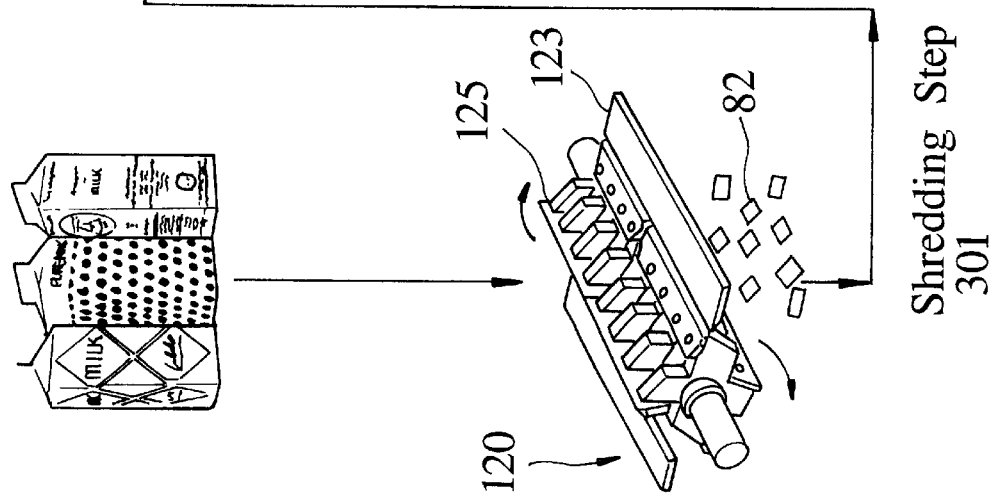

The laminated films recycled as wasted milk carton or juice containers are shredded into fragments having suitable sizes by a shredder as a means of shredding means 120 such as a shredder, as shown in FIG. 1, preferably after having been cleaned. For example, the laminated films are shredded into fragments to be processed 82 which have a side of about 6 to 10 mm.

Figure 2:
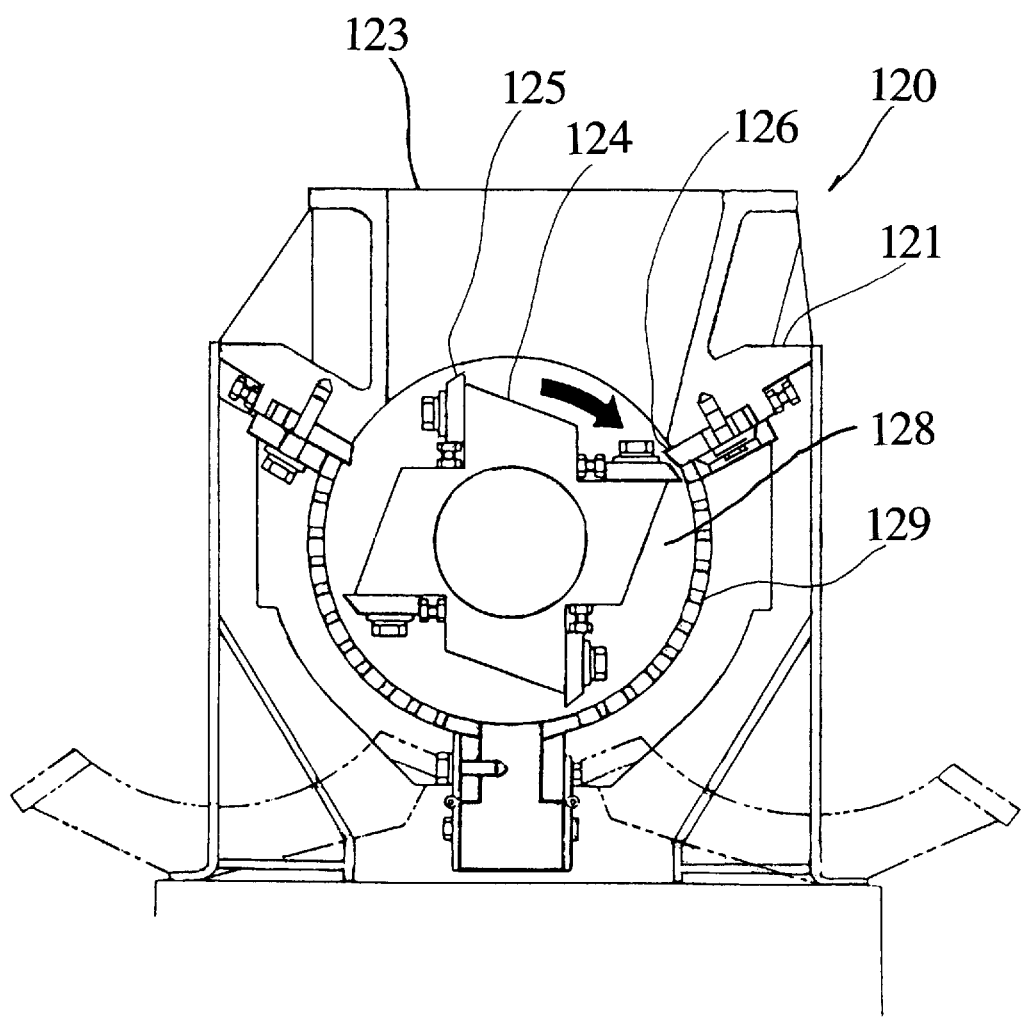
FIG. 2 is a longitudinal cross-sectional view which schematically shows the outline of the construction of shredding means.

The shredding means 120 shreds objects to be shredded, such as the paper containers made of the laminated films, into the fragments to be processed 82 having a suitable size. In the present embodiment, a milling cutter is used as the shredding means 120. FIGS. 1 and 2 show one example of the milling cutter.

A milling cutter main body 121 is provided with an inlet port 123 through which are introduced objects to be shredded, such as paper containers made of the laminated films.

A cutter support 124 is vertically supported between the inner side walls of the milling cutter main body 121 so as to be vertically rotatably actuated by driving means (not shown). Four rotary blades 125, which are oriented with their long axes in the direction perpendicular to the milling cutter main body, are attached to the cutter support 124 along its outer periphery. These four rotary blades 125 are arranged 90 degrees apart in the rotating direction of the cutter support 124, and they are also arranged so that all trace out the same rotary trajectory. Two fixed blades 126 are attached to the milling cutter main body 121 so as to be opposite to the four rotary blades 125 with a small clearance between the fixed blades 126 and the rotary blades 125.

The two fixed blades 126 are arranged along the rotary trajectory of the rotary blades 125 in a substantially symmetrical pattern with respect to the diameter of the cutter support. Objects to be shredded are shredded between the rotary blades 125 and the fixed blades 126 as a result of rotation of the rotary blades 125.

The clearance between the fixed blades 126 and the rotary blades 125 can be freely adjusted so as to shred an object into a desired size. In the present embodiment, the clearance is set in the range of 0.2 to 0.3 mm. The vicinity of the rotary trajectory of the rotary blades 125 is surrounded by a mesh screen 129, except at the inlet port 123. The screen 129 has meshes which permit the passage of the fragments to be processed 82 having a side of about 10 mm. A screen receiver is further provided outside the screen 129 so as to surround it with a predetermined space between them. The fragments to be processed 82 which have passed through the screen 129 are recovered between the space between the screen 129 and the screen receiver. The screen receiver is arranged so that it can be opened and closed, whereby the fragments to be processed 82 which have passed through the screen 129 can be discharged outside the milling cutter main body 121.

In the milling cutter 120 having the above-described construction, the objects to be shredded, which are described hereinabove, are introduced into the milling cutter through the inlet port 123, and the cutter support 124 is rotated by the drive means (not shown). The objects to be shredded are struck between the rotary blades 125 of the cutter support 124 and the fixed blades 126, and the thus-struck objects are then screened by the screen 129. As a result, there are formed square fragments to be processed 82 which are indefinite in shape and area but have a side of about 6 to 10 mm. The screen receiver is then opened so as to allow recovery of the fragments to be processed 82, which are subsequently fed to the next step.

The shredding means used for the present invention is not limited to the milling cutter 120. Any type of cutter capable of shredding objects to be shredded into fragments having a side of about 6 to 10 mm is applicable to the present invention.

It is also possible to wet the fragments to be processed 82 with water before and after the shredding process, before the next process, or during the course of the next process so as to promote the disaggregation of the fragments, as required.

Peeling and Separating Step 303

An impact frictional striking force is applied to the thus-struck fragments to be processed 82. If the fragments to be processed 82 comprise layers of paper and plastic films, the paper layer is struck, separated and disentangled into minute fibers.

The plastic film is separated into plastic film fragments 83a having a size of about 2 to 6 mm. If the fragments to be processed 82 comprise a layer of aluminum foil in addition to the paper and plastic film layers, the aluminum foil layer is separated into aluminum foil fragments 83b having a size of about 2 to 6 mm, in addition to the above-described paper and plastic film fragments. The fibrous paper layers are then classified from the plastic film fragments 83a, or from the mixture of the plastic film fragments 83a and the aluminum foil fragments 83b, whereby aggregated and flocculated paper fibers 84 are recycled. This process can be repetitively carried out several times, as necessary.

As in the case where the fragments to be processed 82 which are subjected to the peeling, separating and classifying step 303 comprise, for example, an aluminum foil layer and a plastic film layer, if the layers of the fragments to be processed are separated into substantially the same size, it is possible to arrange the system in such a way that the fragments to be processed are fed to the next process without undergoing the classifying operations in this step, and that they are classified and recovered according to the type of layer in the next process; that is, the wind force classifying step 305 using wind force classifier.

For convenience's sake, in the present embodiment, the peeling and separating means including classifying means used in the above described step is called a separator. As shown in FIGS. 3 to 6, a separator 130 has an inlet port 132 which communicates with the center of a fixed disk 131 so as to introduce the fragments to be processed 82 into the separator 130. A fixed end plate 133 is positioned so as to be opposite to the fixed disk 131 with a processing space 155 ensured between them. The outer periphery of the fixed disk 131 is fixed to the outer periphery of the fixed end plate 133 by means of a circumferential side plate 135. A movable disk 141 is provided in the processing space 155 so as to be rotated by a horizontal rotary shaft 142. The horizontal rotary shaft 142 is supported by bearings 143, 143. The horizontal rotary shaft 142 is rotated by rotating means such as a motor.

Figure 5:
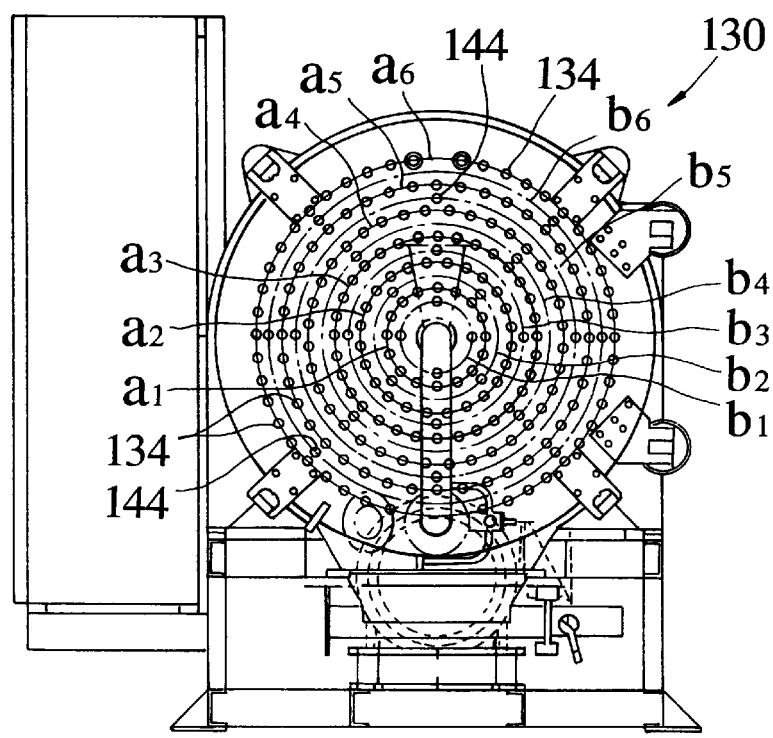
FIG. 5 is a schematic front view for illustrating the peeling and separating operations according to the present invention.
Figure 6:
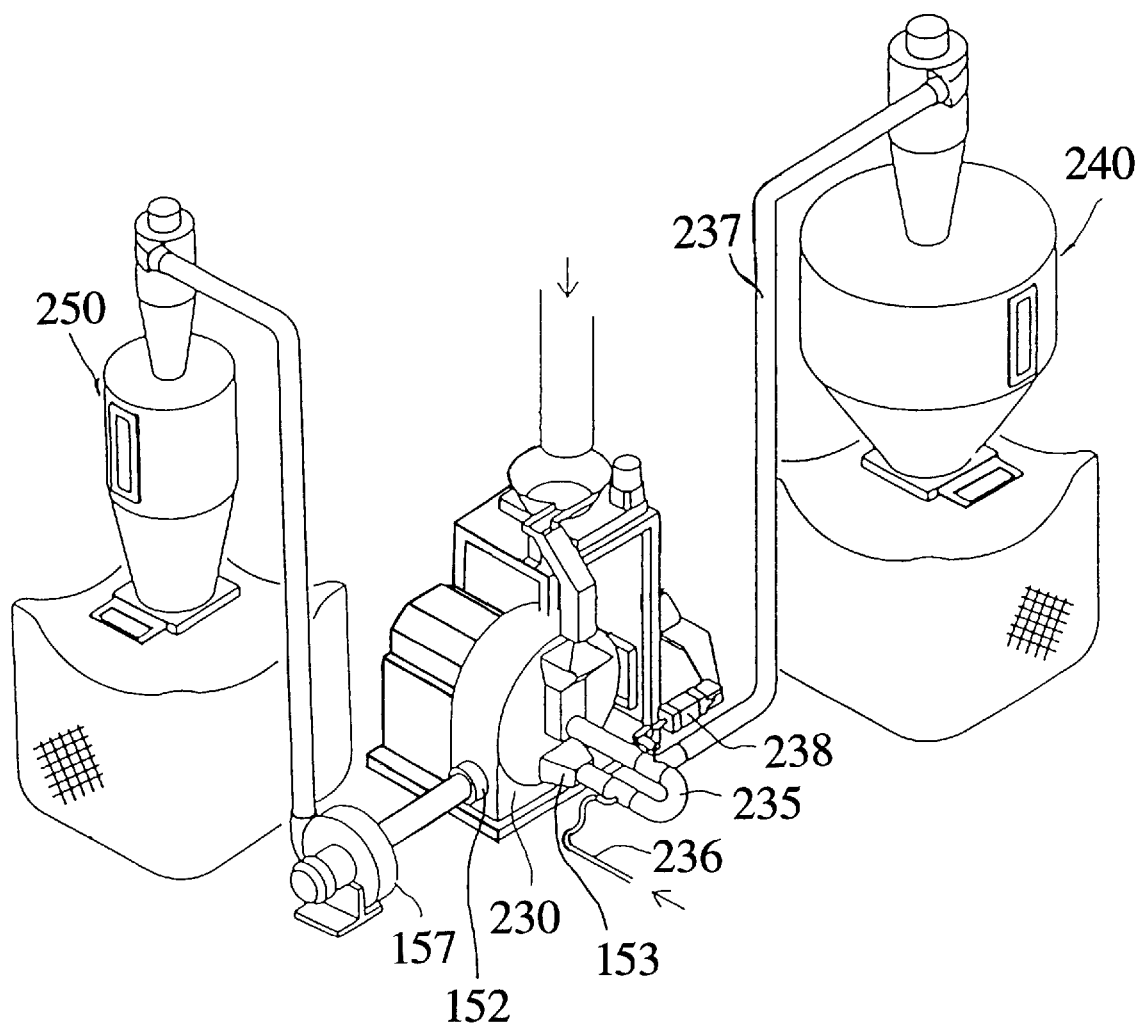
FIG. 6 is a schematic representation which shows an example of the use of the peeling and separating unit used in the peeling and separating process according to the present invention.
Figure 7B:
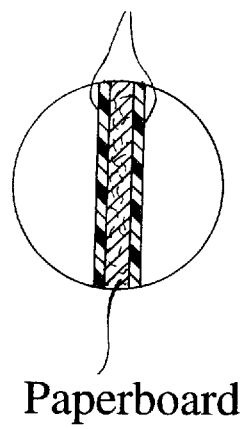
FIG. 7 is a schematic representation showing the structure of a milk carton which is one example of an object to be processed by the present invention.
Figure 7A:
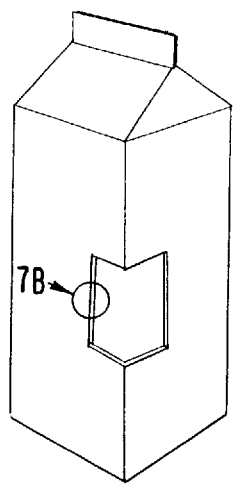

In the present embodiment, a plurality of fixed pins 134 are attached at right angles to the fixed disk 131 so as to form a plurality of concentrically circular patterns (which are relative to the movable disk 141); e.g., six concentrically circular patterns a1 to a6 (FIG. 5). The fixed pins 134 are disposed on the fixed disk 131 from its center to its outer periphery in the concentrically circular patterns with a greater number of pins 134 in each successive layer; namely, 16–24 32–36–40–42. On the other hand, movable pins 144 which are different in number from the fixed pins 134 are attached at right angles to the movable disk 141. They trace out six rotary trajectories b1 to b6 so as to form alternating circular rows of rotary trajectories and concentric circular patterns. The movable pins 144 are disposed on the movable disk 141 from its center to its outer periphery in the following numbers: 4–4–4–4–4–6. The fixed and movable pins and 144 are positioned with respect to each other such that the fragments to be processed 82 undergo peeling and separating effects by means of the impact frictional striking force between them. A screen 151 is circumferentially provided between the outer periphery of the movable disk 141 and the circumferential side plate 135 so as to ensure a predetermined circumferential discharge space 156 between the screen 151 and the side plate 135. Small apertures of a desired size are punched in the screen 151 having predetermined meshes. An exit 152 is formed below the discharge space 156. A blower 157 communicates with the separator 130 via the exit 152, as shown in FIG. 6.

The exit 152 is then connected to a collecting tank 250 via a discharge pipe 239 attached to the blower 157. A three-way solenoid valve (not shown) is disposed downstream the blower 157, and two other collecting tanks 250 (i.e., a total of three collecting tanks 250) communicate with the exit 152 via the discharge pipes 239. With this arrangement, high-purity paper fibers can be recycled, as will be described later.

A screen with apertures of a diameter of about 0.8 to 2.0 mm is used as the screen 151, depending on the number of rotations of the movable pins which will be described later. For the blower 157, either a large blower rated at 37-hp, 5 kg/cm$^3$, 2 m$^3$/min or a compact blower rated at 18.5-hp, 5 kg/cm$^2$, and 1 to 1.5 m$^3$/min. is used with either of the blowers being capable of applying a suction force to the fibrous paper layers together with air in the separator 130.

Figure 3:
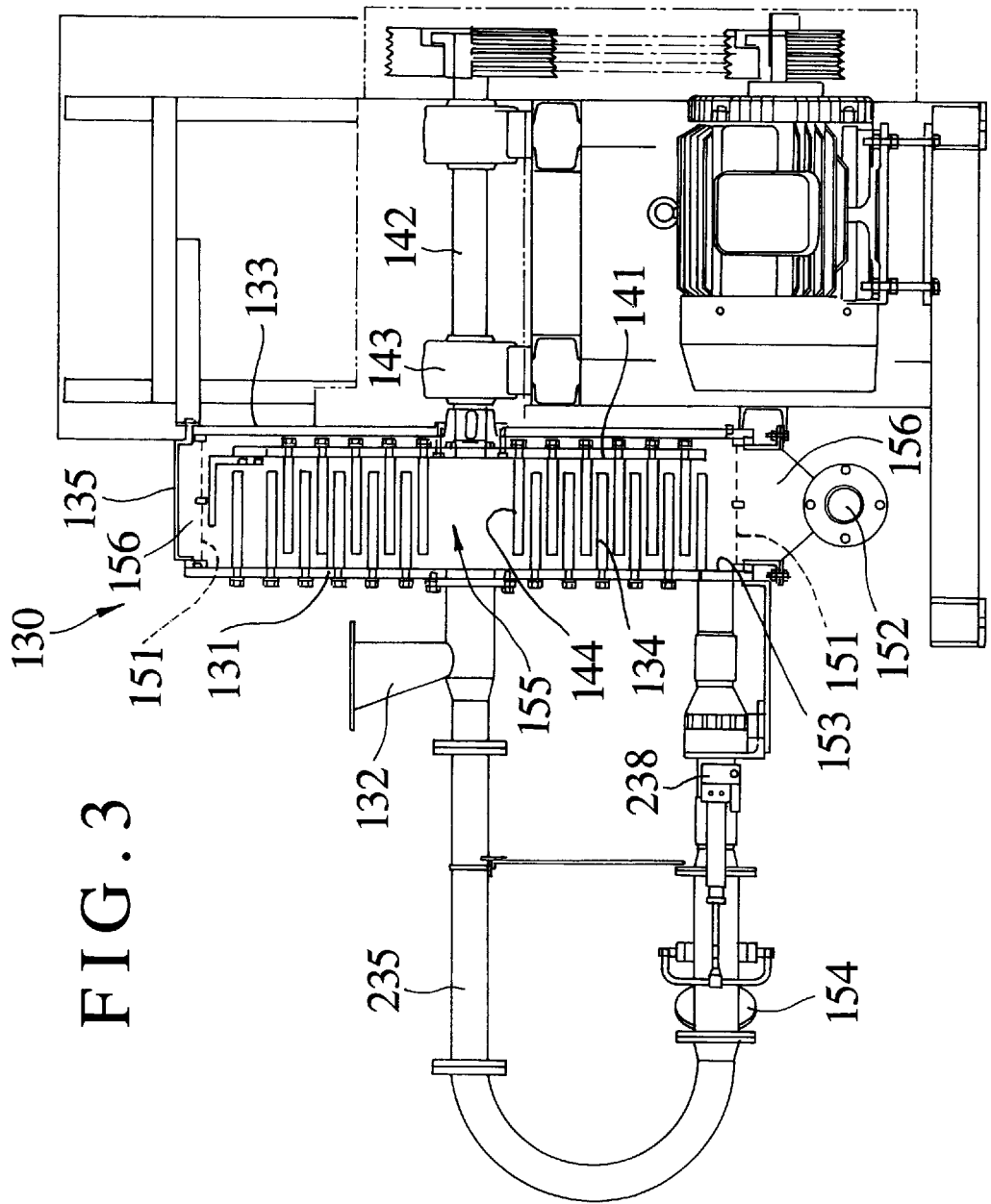
FIG. 3 is a longitudinal partial cross-sectional view which schematically shows the outline of the construction of a peeling and separating unit used in the peeling and separating step according to the present invention.
Figure 4:
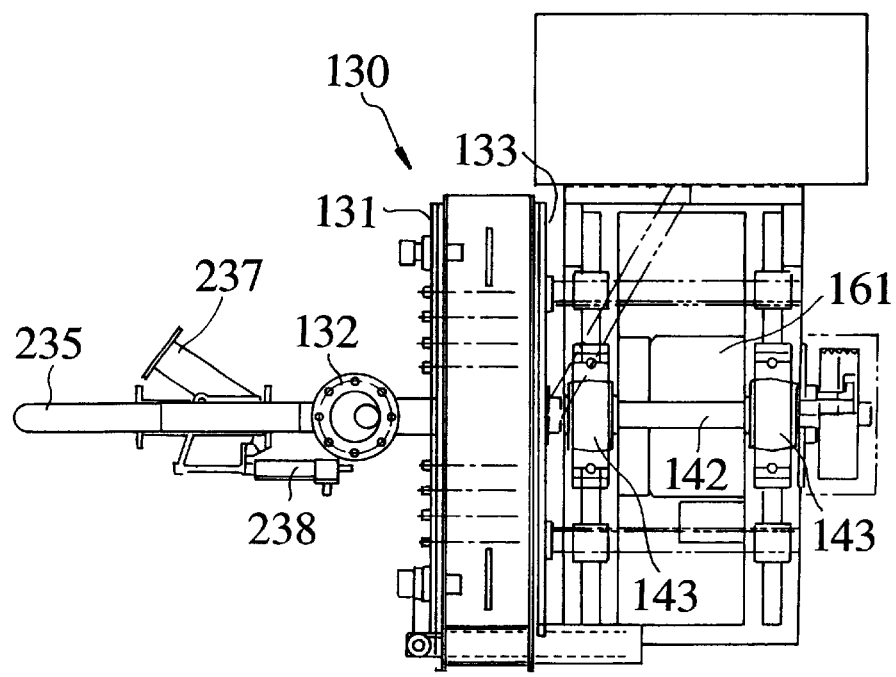
FIG. 4 is a plan view of the peeling and separating unit shown in FIG. 3.

An outlet port 153 is formed in the lower part of the screen 151 within the processing space 155 (FIG. 3).

The frictional striking force applied to the fragments to be processed 82 is reduced by increasing the clearance between the fixed and movable pins 134 and 144, whereas it is increased by decreasing the clearance.

A blower 158 communicates with the outlet port 153 so as to introduce air into the separator 130 by a suction force, as shown in FIG. 1. The outlet port 153 may be connected to the inlet port 132 via the blower 158. Further, the outlet port 153 may be connected to the processing space 155 via a communicating pipe 235, as shown in FIGS. 3 and 6. Compressed air which is supplied from a compressed air source (not shown) and which returns from the outlet port 153 to the processing space 155 is introduced into the communicating pipe 235 via a pipe 236. As a result, the separated plastic film fragments 83a and aluminum foil fragments 83b which are discharged from the outlet port 153 may return again to the processing space 155 of the separator 130.

A branch pipe 237 is provided in the communicating pipe 235 in the vicinity of the inlet port 132 so as to communicate with a collecting tank 240 for collecting the-plastic film fragments 83a or the mixture of the plastic film fragments 83a and the aluminum foil fragments 83b. A two-way solenoid valve 238 which is switched at a predetermined time using, e.g., a timer, as required, is disposed at the branch point of the branch pipe 237. The downstream end of the communicating pipe 235 is closed by a solenoid valve, and the branch pipe 237 is opened. As a result, the plastic film fragments 83a or the mixture of the plastic film fragments 83a and the aluminum foil fragments 83b remaining in the screen 151 are introduced, by a suction force, into the collecting tank 240 via the branch pipe 237. Alternatively, solenoid valves may be respectively disposed at the branch pipe 237 and the downstream side of the communicating pipe 235 such that these two solenoid valves are alternately opened and closed (FIG. 6).

The horizontal rotary shaft 142 is rotated by rotating means such as a motor, so that the movable disk 141 is also rotated. At this time, if the fragments to be processed 82 are introduced into the inlet port 132, the fragments to be processed 82 are subjected to an impact frictional striking force, which develops between the fixed and movable pins 134 and 144, in the center of the processing space 155. As a result, the paper and plastic film layers, or the paper, plastic film, and aluminum foil layers of the fragments to be processed 82 are peeled off or separated from one another. Among these layers, the paper layer is disentangled into minute fibers by means of the impact frictional striking force. In contrast, the plastic film and aluminum foil layers are separated into the thin-strip-like plastic film fragments 83a and aluminum foil fragments 83b which are indefinite in size but which have a diameter of about 2 to 6 mm, by means of the impact frictional striking force.

In short, the fragments to be processed 82 are smashed by the impact striking force applied from the fixed and movable pins 134 and 144, whereby the paper layer on the surface of the fragments to be processed 82 is minutely crushed or fractured. At the same time, the fragment to be processed 82 repetitively undergoes a bending action, causing the minutely fractured paper layer to be separated from the fragment to be processed 82.

In this way, the paper and plastic film, or the paper, plastic film and aluminum foil layers of the fragment to be processed 82 are peeled and separated from one another according to the type of layer. The paper layer is fibrously disentangled, whilst the plastic film and aluminum foil layers are separated into the plastic film fragments 83a and the aluminum foil fragments 83b, respectively. Meanwhile, the thus separated fibrous paper layer and the plastic film fragments 83a, or the mixture of the fibrous paper layer, the plastic film fragments 83a, and the aluminum foil fragments 83b move close to the screen 151 provided along the outer periphery of the separator 130, by virtue of centrifugal force resulting from the rotation of the movable disk 141, suction applied by the blower 157, or an airflow caused by the compressed air fed to the processing space 155 via the pipe 236. Only the fibrous paper layers pass through the screen 151 having meshes which measure 0.8 to 2 mm and are discharged into the discharge space 156. The fibrous paper layers are then conveyed to the outside via the exit 152 and the blower 157. They are then collected into the collecting tank 250 via the discharge pipe 239, and the fibrous paper layers are classified and recycled in the form of the aggregated and flocculated paper fibers 84.

On the other hand, neither the plastic film fragments 83a nor the mixture of the plastic film fragments 83a and the aluminum foil fragments 83b pass through the screen 151, and they remain in the processing chamber.

After the completion of the collection of the paper fibers 84, the outlet port 153 and the processing space 155 are connected together via the communicating pipe 235, as required. The plastic film fragments 83a, or the mixture of the plastic film fragments 83a and the aluminum foil fragments 83b remaining in the processing space are returned again to the processing space 155. As a result, it becomes possible to further remove the paper layer still adhering to the plastic film fragments 83a and the aluminum foil fragments 83b. Thereafter, the plastic film fragments 83a, or the mixture of the plastic film fragments 83a and the aluminum foil 83b thus separated from the paper layer are discharged to the outside from the outlet port 153.

Using the two-way solenoid valve 238 of the branch pipe 237 provided in the communicating pipe 235 in the vicinity of the inlet port 132 so as to communicate with the collecting tank 240 for collecting the plastic film fragments 83a, the communicating pipe 235 has its downstream end closed and the other side located near the branch pipe 237 is opened. As a result, the plastic film fragments 83a, or the mixture of the plastic film fragments 83a and the aluminum foil fragments 83b are introduced by a suction force into the collecting tank 240 via the branch pipe 237.

As shown in FIG. 3, the communicating pipe 235 is connected to the branch pipe 237 by means of a flange 154 disposed in a pipe between the upstream side of the communicating pipe 235 and the outlet port 153 (in a rearward direction in FIG. 3).

The thus-collected paper fibers 84 are recycled by the known method. The outer periphery of the above-described paper containers; that is, the surface of the plastic film layer covering the paper layer, has printed layer such as a trade name, a trademark, and indications related to contents. These printed layers do not come away from the surface of the plastic film even as a result of the processing in the separator. Since the printed matters remain adhered to the surface of the plastic film fragments 83a, the paper fibers 84 thus collected in the above described step are free from ink provided on the surface of the plastic film.

Classifying Step: Wind Force Clasifying Step 305

In the case of the laminated films to be recycled comprising a plastic layer and an aluminum foil layer, a plurality of layers, that is, the plastic and aluminum foil layers, are separated to substantially the same size as a result of application of the impact frictional striking force in the preceding peeling and separating step 303, and they remain in the separator. This step is to classify the thus-remaining separated fragments by the difference in specific gravity such that the fragments are individually collected. This step is carried out not only for the case of the laminated film comprising paper, plastic film, and aluminum foil layers, but also for the case of laminated films made by the polymerization of aluminum foil and a plastic film. Like the case of the laminated film which comprises paper and plastic film and is used as one example in the descriptions of the preceding step, if the laminated films comprise layers which are separated into different size by the impact frictional striking force, they can be collected according to the type of layer by classifying carried out in the peeling and separating step 303. Hence, the present step may be omitted.

Taking the laminated film comprising paper, plastic film, and aluminum foil layers as an example of an object to be recycled, the plastic film fragments 83a and the aluminum fragments 83b withdrawn by the removal means in the preceding step are mixed together when they are taken out of the separator 130. Using a suction type wind-force classifier 30 which includes a blower 33 equipped with a cyclone 31 and is capable of applying a suction force at a rate of 200 to 500 Kg/h, the plastic film fragments 83 are collected from the mixture by suction, whereby the aluminum foil fragments 83b are also taken out (FIG. 1).

In this way, it is possible to individually collect the plastic film fragments 83a and the aluminum fragments 83b. The amount of another layer adhering to the plastic film fragments 83a and the aluminum foil fragments 83b is very small.

For these reasons, the thus-collected aluminum fragments are recycled as raw materials of various aluminum products. Further, the plastic film fragments are compressed into pellets, and these pellets can be recycled as raw materials of various molded plastic products. Molded plastic articles which are reproduced from the raw materials, i.e., the plastic film fragments collected in the present step, are colored by the print ink adhered to the surface of the plastic film fragments. Therefore, applications of the thus-recycled plastic materials are limited to molded products, such as artificial lumber and colored wrapping films, in which coloring does not cause any problems.

Results of the test of recycling of laminated films using the recycling apparatus of the present invention will be described hereinbelow.

Embodiment 1

Milk cartons used as a container of milk were collected, and a 60 g of laminated film forming the milk cartons was treated as a subject to be recycled.

The milk cartons were made of a laminated film, and the laminated film was comprised of a paperboard having both sides coated with polyethylene layers. The ratio of the paperboard layer to the polyethylene film layer was 51.1 g (83.5 wt. %) to 9.9 g (16.5 wt. %) including the weight of print ink. The thickness of the film of the milk carton was about 0.5 mm, and the thickness of the top of the package where the films are bonded together was about 2.2 mm. The thickness of the bottom of the package where the films are also bonded together was about 1.1 mm.

The above described milk cartons were shredded into square fragments having a side of 6 to 10 mm using the milling cutter, whereby fragments to be processed were obtained. These fragments to be processed (60 g) were introduced into the separator equipped with a 0.8-mm mesh screen and rotating at 55 Hz and 1200 r.p.m. The impact fictional striking force was applied to the fragments to be processed for about five minutes.

After the rotation of the separator, the separation of the polyethylene film layer from the paper layer suddenly started after the lapse of about 2 and half minutes. The thus-separated paper layer was separated into minute fibers, and the thus-struck fibers classified by passing through the screen with apertures having a diameter of 1 mm. The fibers were then discharged to the outside of the separator and were sent to the tank 250 via the discharge pipe 239 by suction of the blower 157. In the end, the aggregated and flocculated paper fibers were obtained.

On the other hand, the polyethylene film layer peeled off or separated from the paper layer remained in a struck condition in the separator. The polyethylene film layer was then sent to the tank 240 via the branch pipe 237 by means of the operation of the solenoid valve. Thus, the polyethylene film layer was collected while being separated from the paper layer.

As described above, the struck paper layer and polyethylene film layer were substantially completely separated from each other after the lapse of about three to five minutes since the separator was activated. In the end, they were able to be individually collected.

A printed surface on the outer surface of the milk carton remained on the polyethylene film fragments, just as it was. No ink adhered to the collected paper fibers.

The thus-collected paper fibers are usable as pulp materials which are materials of recycled paper. On the other hand, the polyethylene film fragments are usable as materials of various plastic products.

Embodiment 2

The recycling test was carried out using 60 g of brick-type paper containers of fruit juice. The paper containers were made of a paperboard having its front side (the side which appeared outside when the paperboard was formed into a container) covered with a polyethylene film, and its rear side (the side which appeared inside of a container when the paperboard was formed into the container) coated with a film made by the polymerization of aluminum foil and a polyethylene film, in that order.

The laminated paper (60 g) obtained from the brick-type paper containers had the ratio of the paper layer to the polyethylene film layer and the aluminum foil layer, being 48.6 g (81.0 wt. %) to 11.4 g (19.0 wt. %) which includes the weight of print ink. Further, the ratio of the polyethylene layer to the aluminum foil layer was 2.0 g (17.7 wt. %) to 9.4 g (82.3 wt. %).

The thickness of the laminated-film which formed the brick-type paper packages was about 0.4 to 0.5 mm.

The above-described brick-type paper packages were shredded into square fragments having a side of 6 to 10 mm after having been preferably cleaned and dried, whereby the fragments to be processed were obtained. These fragments to be processed (60 g) were introduced into the separator which rotates at 60 Hz and 1400 r.p.m. The impact frictional striking force was applied to the fragments to be processed (60 g) for about five minutes.

As a result of the rotation of the separator which contains the -fragments to be processed, the paper layer in the fragments to be processed was disentangled into fibers. The polyethylene film layer and the aluminum foil layer were struck and separated into thin-strip-shaped polyethylene film fragments and aluminum foil fragments. Of these processed substances, the fibrously disentangled paper layer classified by passing through the screen with apertures which have a width of 1 mm. The paper layer was discharged to the outside of the separator and was collected in the form of aggregated and flocculated paper fibers.

On the other hand, the plastic film fragments and the aluminum foil fragments which were struck into thin strips having indefinite shape and measuring about 2 to 6 mm and could not pass through the screen mixedly remained in the separator. They were thus collected.

As with the paper fibers in the first embodiment, no print ink adhered to the thus-collected paper fibers.

Subsequently, the polyethylene film fragment and the aluminum foil fragment mixedly remaining in the separator were taken out of the separator, and then they were classified in wind force classifying step 305 using the cyclone, whereby they were individually collected.

The paper layer substantially adhered to neither the thus-collected polyethylene fragment nor the aluminum foil fragment, and hence they are usable as raw materials of various aluminum products and raw materials of molded plastic products.

Embodiment 3

Using the same samples as those used in Embodiments 1 and 2, the same fragments to be processed were prepared and were introduced into the separator equipped with a 1.8-mm mesh screen and rotating at 20 Hz and 400 r.p.m. An impact frictional striking force was applied to the fragments to be processed for about seven minutes.

The solenoid valve (not shown) disposed at downstream of the blower 157 was activated for one minute, and separated foreign articles were collected in the first tank. Most of them were protein and oil and fat of the milk and impurities other than paper fibers. Subsequently, the three-way solenoid valve was switched for four minutes, and separated substances were collected in the second tank. They were high-quality long paper fibers without foreign articles. The thus-collected paper fibers accounted for about 70% of the entire volume of the recycled paper fibers. The three-way solenoid valve was further switched for one to two minutes, and resultant paper fibers completely separated from plastic or plastic and aluminum foil were collected in the third tank. The thus-obtained paper fibers accounted for about 30% of the entire volume of the recycled paper fibers.

After having classified the paper fibers obtained in Embodiments 1 and 3 using 40-mesh screen, 47% of the paper fibers obtained in Embodiment 1 remained on the screen, and 67.5% of the paper fibers obtained in Embodiment 3 remained on the screen. It turned out that the paper fibers obtained in Embodiment 3 were sufficiently usable as a white paper board because they were long. For the pulp-like substances obtained as a result of the water disaggregation of the samples of Embodiment 1, 75.1% of them remained on the screen. Even when they were processed using the separator in Embodiment 3, only 10% or thereabouts of the paper fibers were destroyed. As a result of the observation of the paper fibers using a microscope, the paper fibers collected in Embodiment 3 were substantially the same in length as the material pulp, and they were free from stranded fibers. Thus, they were also suitable for recycling purposes.

Since the recycling method and apparatus of the present invention has the above described configuration, it is possible to separate and collect the layers of the laminated film according to the type of layer only by applying the impact frictional striking force to the fragments to be processed produced from the laminated film. Compared with the conventional method and apparatus for recycling the laminated film comprising a paper layer, the recycling method and apparatus of the present invention makes it possible to recycle the laminated films with a fewer number of processing steps and using smaller-scale equipment. Further, the method and apparatus of the present invention carries out only dry processing. Hence, there is no risk of pollution due to waste liquids, which in turn makes it possible to reduce the burdens associated with the processing of the waste liquids.

According to the method and apparatus of the present invention, it is possible to individually collect the layers of the laminated film according to the type of layer, and it is also possible to recycle laminated films which do not include any paper layers. Therefore, it is possible to recycle not only the paper layer which is recycled as reproduced paper but also other plastic film and aluminum foil layers.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The entire disclosure of Japanese Patent Application No. 8-86532 filed on Apr. 9, 1996, including the specification, abstracts, drawings and claims, is herein incorporated by reference in its entirety.

What is claimed is:

1. A method for recycling a laminated film which includes a plurality of layers made of different materials, the method comprising at least the following steps of:

shredding the laminated film into a plurality of fragments to be processed;

peeling and separating each of the layers of the fragments to be processed according to the type of layer, respectively by applying an impact frictional striking force to each of the fragments to be processed formed in the preceding step;

classifying and collecting the separated layers of the fragments to be processed by use of a screen; and returning the largest struck fragments to be processed that do not pass through the screen to the step of applying an impact frictional striking force.

2. The method for recycling a laminated film according to claim 1, further comprising a step of collecting the layers in a layer-by-layer manner by classifying each of the layers of the fragments to be processed which has been peeled and separated in the preceding step according to the type of layer.

3. The method for recycling a laminated film according to claim 1, wherein the laminated film includes at least a paper layer.

4. The method for recycling a laminated film according to claim 1, further comprising a step of peeling and separating a laminated film having a paper layer and a plastic film layer into a fibrously struck paper layer and a plastic film layer separated into a thin strip, and collecting the fibrously struck paper layer as paper fibers by classifying it from the plastic film layer.

5. The method for recycling a laminated film according to claim 1, further comprising the following steps of:

peeling and separating a laminated film having a paper layer, a plastic film layer, and an aluminum foil layer into a fibrously struck paper layer, a plastic film layer separated into a thin strip, and an aluminum foil layer separated into a thin strip, and collecting the fibrously struck paper layer as paper fibers by classifying it from the plastic film layer and the aluminum foil layer; and individually collecting the plastic film layer and the aluminum foil layer by classifying the plastic film layer from the aluminum film layer using a wind force.

6. The method for recycling a laminated film according to claim 1, wherein the fragment to be processed undergoes promotion of water disaggregation.

7. The method according to claim 1, wherein the laminated film include a paper layer, a plastic film layer, and an aluminum foil layer.

8. The method according to claim 1, wherein the laminated film includes a paper layer and a plastic film layer.

9. An apparatus for recycling a laminated film having a plurality of layers made of different materials, the apparatus comprising at least:

shredder which shreds the multilayered film into a plurality of fragments to be processed;

fixed-side peeling and separating means which includes a fixed disk having the center thereof communicated with an inlet port for introducing the fragments to be processed and pins fixedly provided on the fixed disk in the order so as to trace out a plurality of rotary trajectories;

movable-side peeling and separating means which includes a movable disk rotatably provided so as to be opposite to the fixed disk and movable pins provided on the movable disk in the order so as to trace out a plurality of rotary trajectories different from those which the fixed pins trace out;

collecting means which is disposed along the outer periphery defined by the combination of the fixed pins and the movable pins and which communicates with an outlet port via a screen having small apertures formed therein, each aperture of a predetermined diameter;

means for taking out the struck fragments remaining in the screen via the outlet port;

the outlet port and the inlet port are held in communication with each other so that the struck fragment collected at the outlet port to be treated may be fed back to the inlet port by a communicating pipe, and a branching pipe is arranged to make the communicating pipe branched at the inlet port side and held in communication with a tank for collecting the struck fragment, a solenoid valve disposed at the junction of the branching pipe; and peeling and separating means for peeling and separating the layers of the laminated film according to the type of layer by impact striking the fragments to be processed between the fixed and movable pins using the impact frictional striking force.

10. The apparatus for recycling a laminated film according to claim 9, further comprising:

wind force classifying means which classifies the peeled and separated layers by a wind force, and which individually collects the layers as a result of the classification.

11. The apparatus for recycling a laminated film according to claim 9, wherein the outlet port is connected to the inlet port via a communicating pipe having a blower.

12. The apparatus for recycling a laminated film according to claim 11, wherein a branch pipe which communicates to a tank for collecting the plastic film fragment or the mixture of plastic film and aluminum foil fragment is disposed at the inlet port side of the communicating pipe, and a two-way solenoid valved is disposed at the branch pipe.

13. The apparatus for recycling a laminated film according to claim 9, wherein a pipe for feeding compressed air is connected to the communicating pipe which connects the outlet port to the inlet port so as to introduce the compressed air into the communicating pipe.

14. The apparatus for recycling a laminated film according to claim 9, wherein a solenoid valve for opening and closing the branch pipe, and a solenoid valve for opening and closing the downstream side of the communicating pipe are provided, and these two solenoid valves are alternately opened and closed.

15. The apparatus for recycling a laminated film according to claim 9, wherein the outlet port is connected to the collecting tank by way of a discharge pipe having a blower.

16. The apparatus for recycling a laminated film according to claim 15, wherein the outlet port is connected to three collecting tanks by way of a discharge pipe having a blower and a three-way solenoid.

* * * * *